(12) United States Patent
Schütz

(10) Patent No.: US 11,161,472 B2
(45) Date of Patent: *Nov. 2, 2021

(54) COUPLING DEVICE FOR THE ATTACHMENT OF AN AIRBAG MODULE TO A VEHICLE STEERING WHEEL IN AN OSCILLATORY MANNER

(71) Applicant: TRW Automotive Safety Systems GmbH, Aschaffenburg (DE)

(72) Inventor: Dominik Schütz, Heimbuchenthal (DE)

(73) Assignee: TRW AUTOMOTIVE SAFETY SYSTEMS GMBH, Aschaffenburg (DE)

(*) Notice: Subject to any disclaimer, the term of this patent is extended or adjusted under 35 U.S.C. 154(b) by 36 days.

This patent is subject to a terminal disclaimer.

(21) Appl. No.: 16/090,328

(22) PCT Filed: Aug. 9, 2017

(86) PCT No.: PCT/EP2017/070144
§ 371 (c)(1),
(2) Date: Oct. 1, 2018

(87) PCT Pub. No.: WO2018/108335
PCT Pub. Date: Jun. 21, 2018

(65) Prior Publication Data
US 2020/0377139 A1 Dec. 3, 2020

(30) Foreign Application Priority Data
Dec. 15, 2016 (DE) .................. 102016124530.5

(51) Int. Cl.
*B60R 21/203* (2006.01)
*B60R 21/235* (2006.01)
(Continued)

(52) U.S. Cl.
CPC ............ *B60R 21/203* (2013.01); *B60Q 5/003* (2013.01); *B60R 21/2037* (2013.01);
(Continued)

(58) Field of Classification Search
CPC ...... B62D 1/11; B60R 21/235; B60R 21/2037
See application file for complete search history.

(56) References Cited

U.S. PATENT DOCUMENTS 7,694,997 B2 * 4/2010 Burghardt ........... B60R 21/2037
280/728.2
8,720,942 B2 5/2014 Onohara
(Continued)

FOREIGN PATENT DOCUMENTS

DE 3710173 10/1988
DE 102009050893 4/2011
(Continued)

*Primary Examiner* — Faye M Fleming
(74) *Attorney, Agent, or Firm* — Tarolli, Sundheim, Covell & Tummino LLP

(57) ABSTRACT

The invention relates to a coupling device (16) for mounting an airbag module (14) to be oscillating on a steering wheel structure (12) of a vehicle steering wheel (10), comprising a mounting member (18) which includes, relative to a steering wheel axis (A), an axial bottom side (20) which in the assembled state of the vehicle steering wheel (10) faces the steering wheel structure (12) as well as an opposite axial top side (22) which in the assembled state of the vehicle steering wheel (10) faces the airbag module (14), a contact face (24) for a damping element (26) provided on the axial bottom side (20) for oscillating coupling of the mounting member (18) to the steering wheel structure (12), and comprising a locking element (28) disposed on the top side (22) of the mounting member (18) for locking with the prefabricated airbag module (14), wherein the locking element (28) is configured so that the airbag module (14) can be coupled to (Continued)

the mounting member (18) by a locking connection substantially in an axially fixed manner or in an axially restrictedly movable manner.

15 Claims, 6 Drawing Sheets

(51) Int. Cl.
    *B60Q 5/00*     (2006.01)
    *B62D 1/11*     (2006.01)

(52) U.S. Cl.
    CPC ............ *B60R 21/235* (2013.01); *B62D 1/11* (2013.01); *B60R 2021/23504* (2013.01)

(56) References Cited

U.S. PATENT DOCUMENTS

| | | | | |
|---|---|---|---|---|
| 10,150,441 | B2* | 12/2018 | Sella | ............ B62D 7/222 |
| 10,351,089 | B2* | 7/2019 | Ishii | ............ B60R 21/2037 |
| 2004/0004344 | A1* | 1/2004 | Kim | ............ B60R 21/2037 |
| | | | | 280/731 |
| 2004/0026908 | A1 | 2/2004 | Schneider et al. | |
| 2007/0210564 | A1 | 9/2007 | Vazquez et al. | |
| 2017/0361801 | A1* | 12/2017 | Banno | ............ B60R 21/2037 |
| 2019/0217800 | A1* | 7/2019 | McMillan | ............ B60Q 5/003 |
| 2020/0139915 | A1* | 5/2020 | Funk | ............ B60R 21/2037 |
| 2020/0148155 | A1* | 5/2020 | Kwon | ............ B60R 21/2037 |
| 2020/0156691 | A1* | 5/2020 | Jung | ............ B62D 7/222 |
| 2020/0189657 | A1* | 6/2020 | Gothekar | ............ B60Q 5/003 |
| 2020/0216008 | A1* | 7/2020 | Burger | ............ B60R 21/2037 |

FOREIGN PATENT DOCUMENTS

| | | |
|---|---|---|
| EP | 1790536 | 5/2007 |
| WO | 2011054449 | 5/2011 |
| WO | 2018108335 | 6/2018 |

* cited by examiner

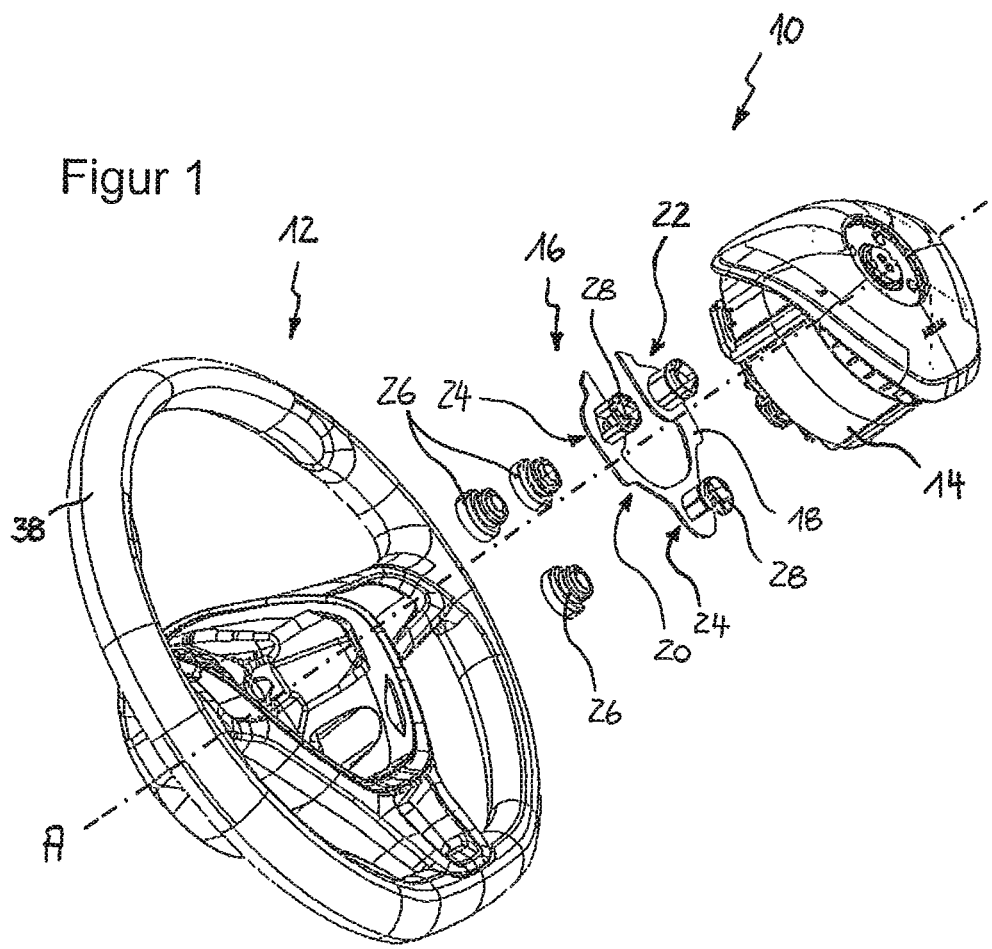
Figur 1
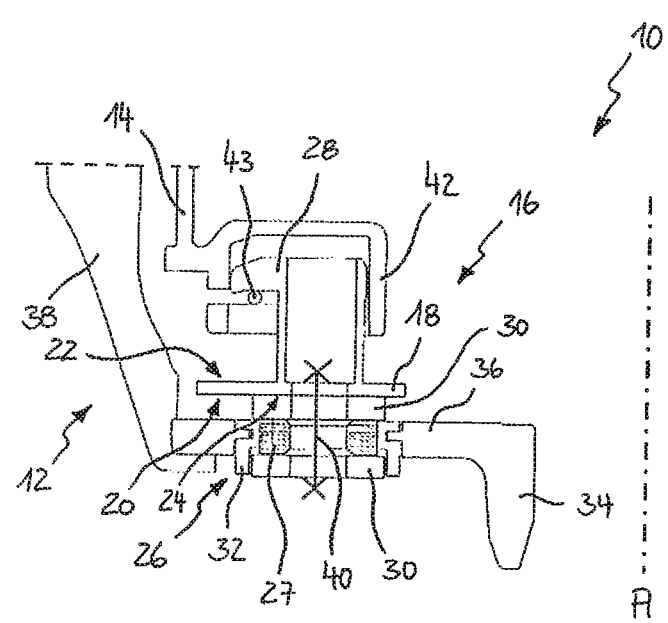
Figur 2

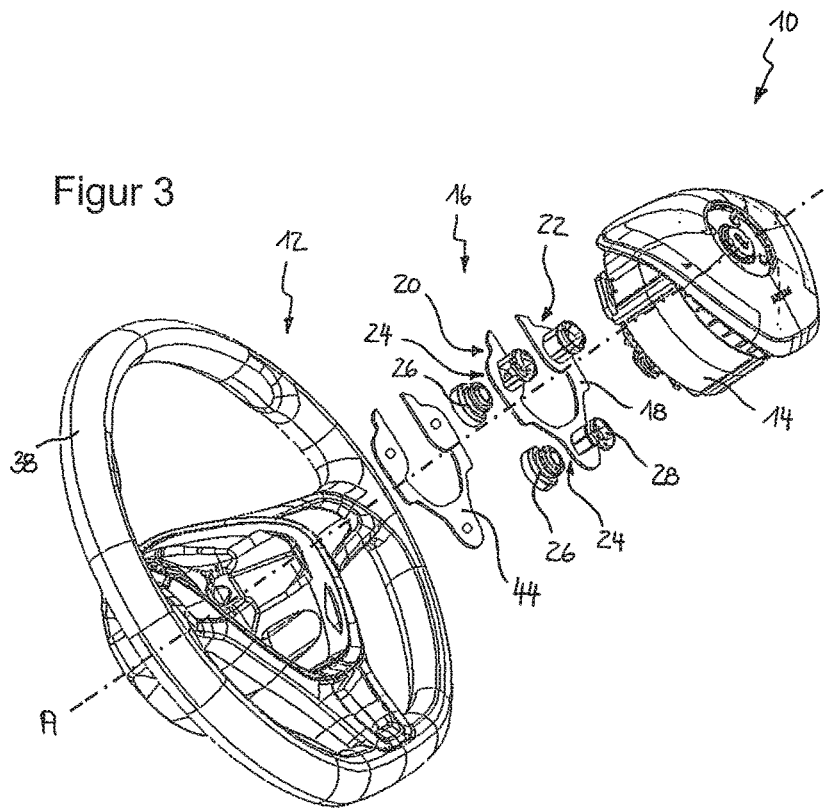
Figur 3
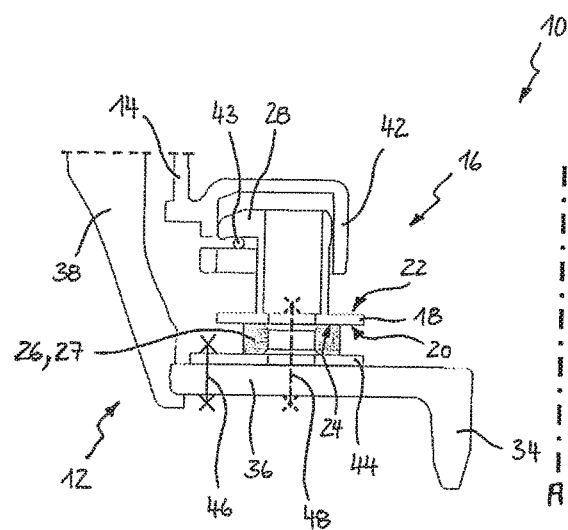
Figur 4

Figur 5
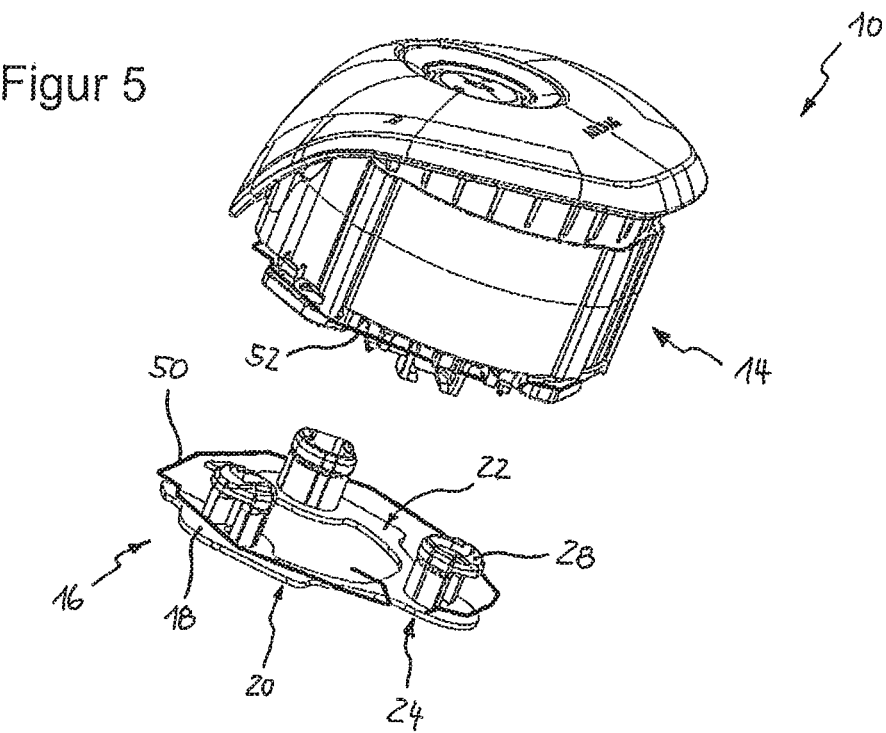
Figur 6
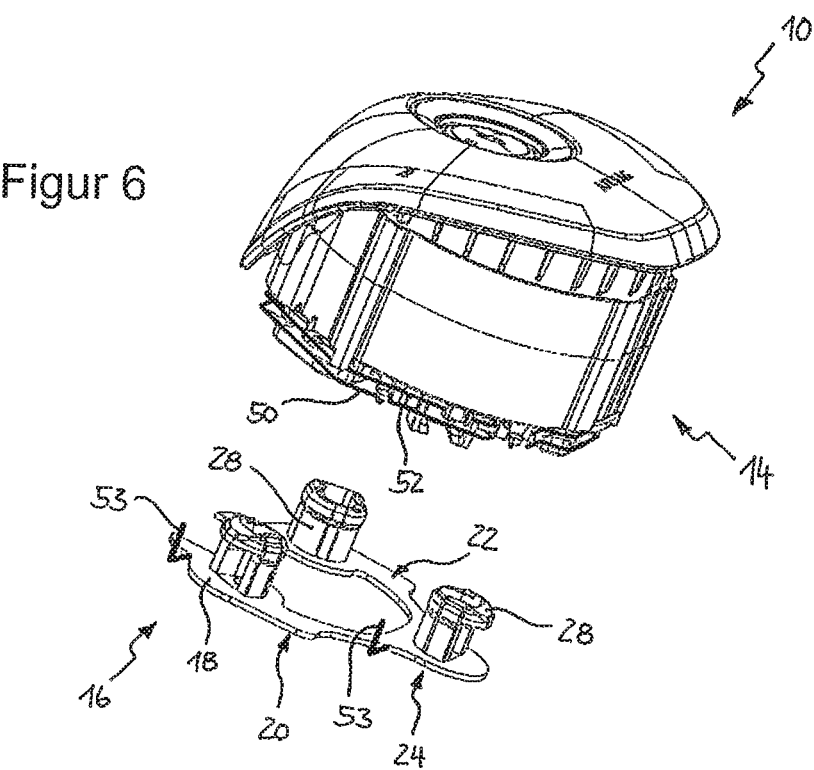

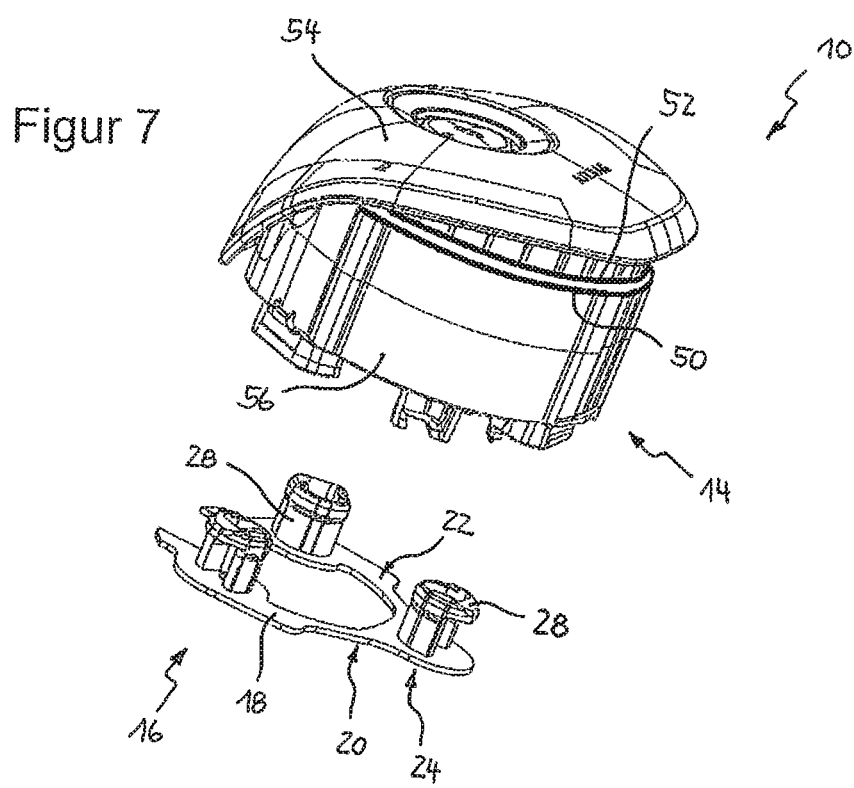
Figur 7
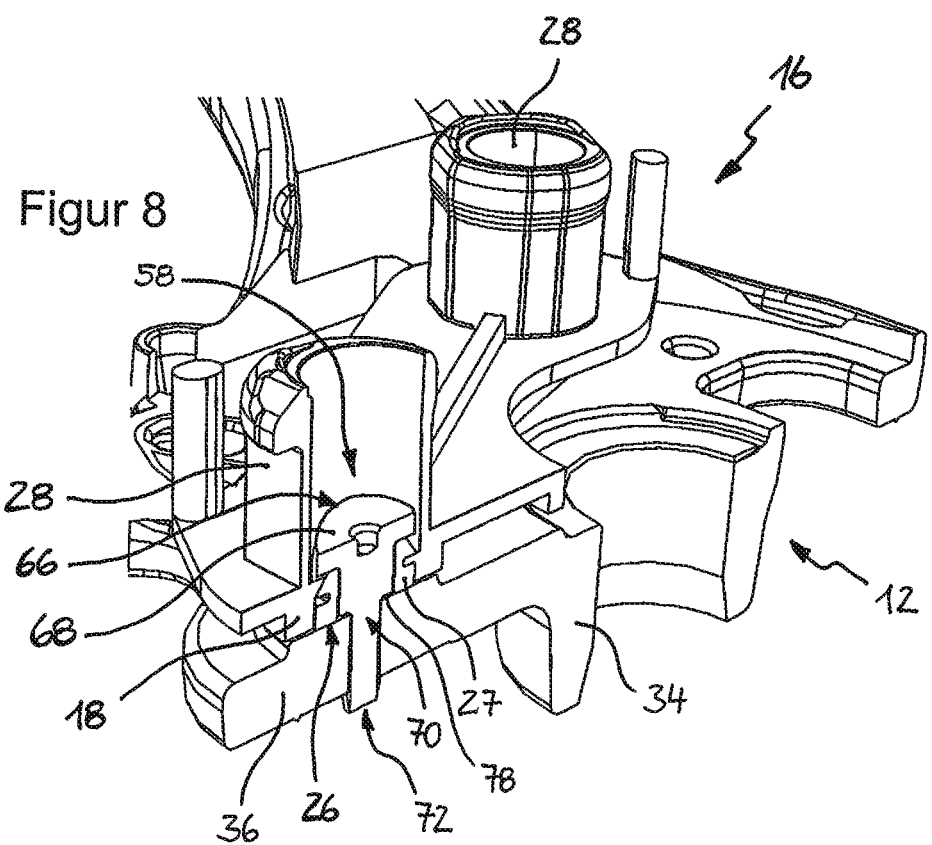
Figur 8

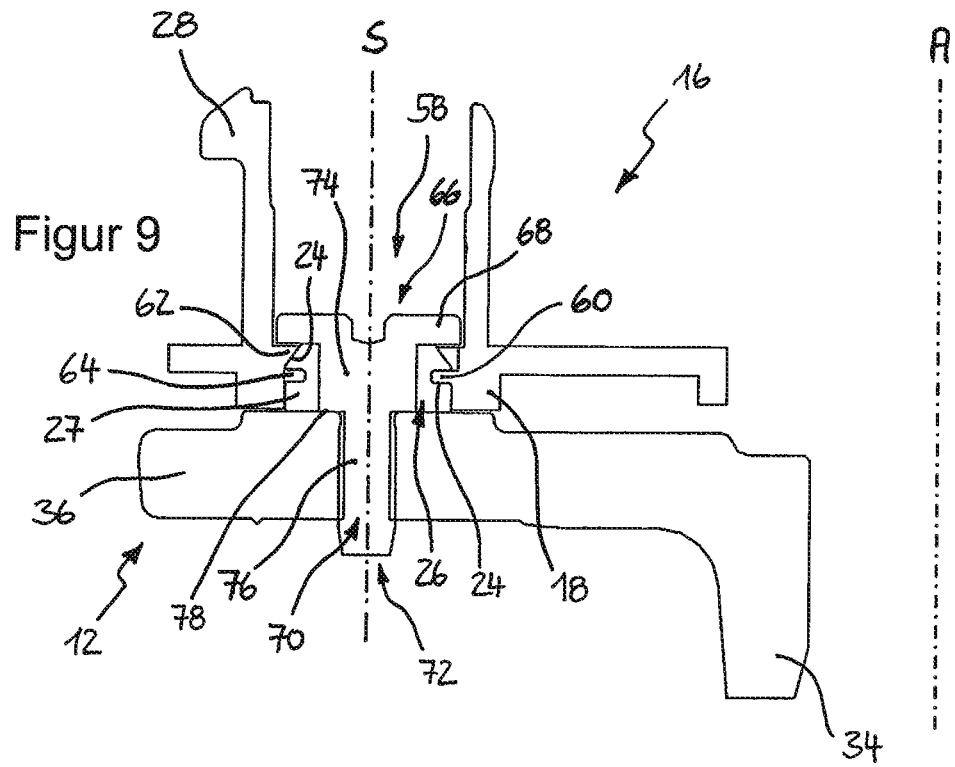
Figur 9
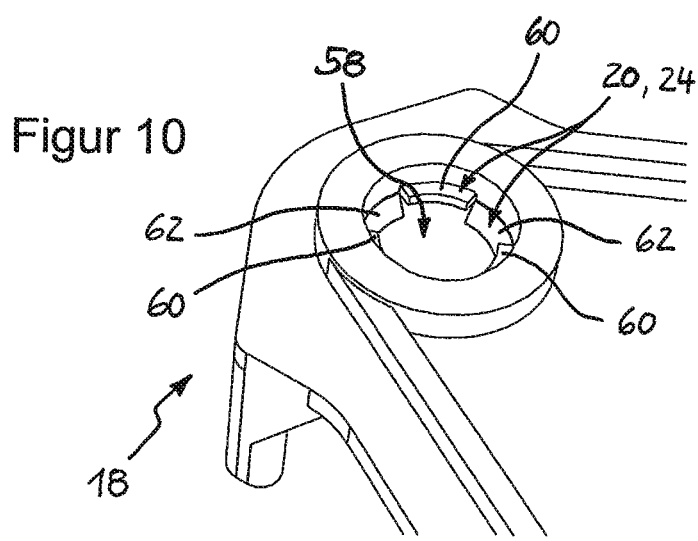
Figur 10
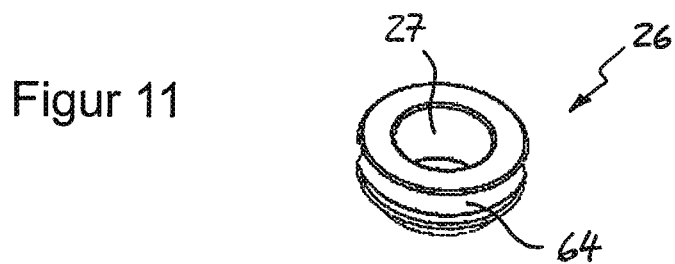
Figur 11

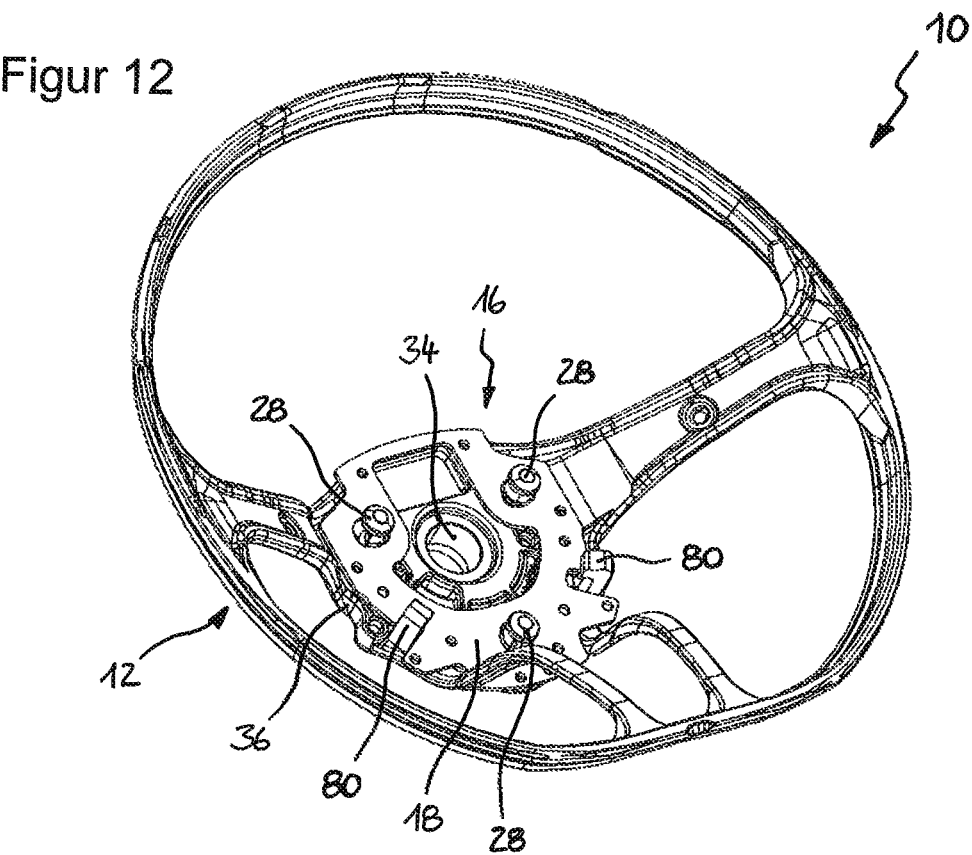
Figur 12
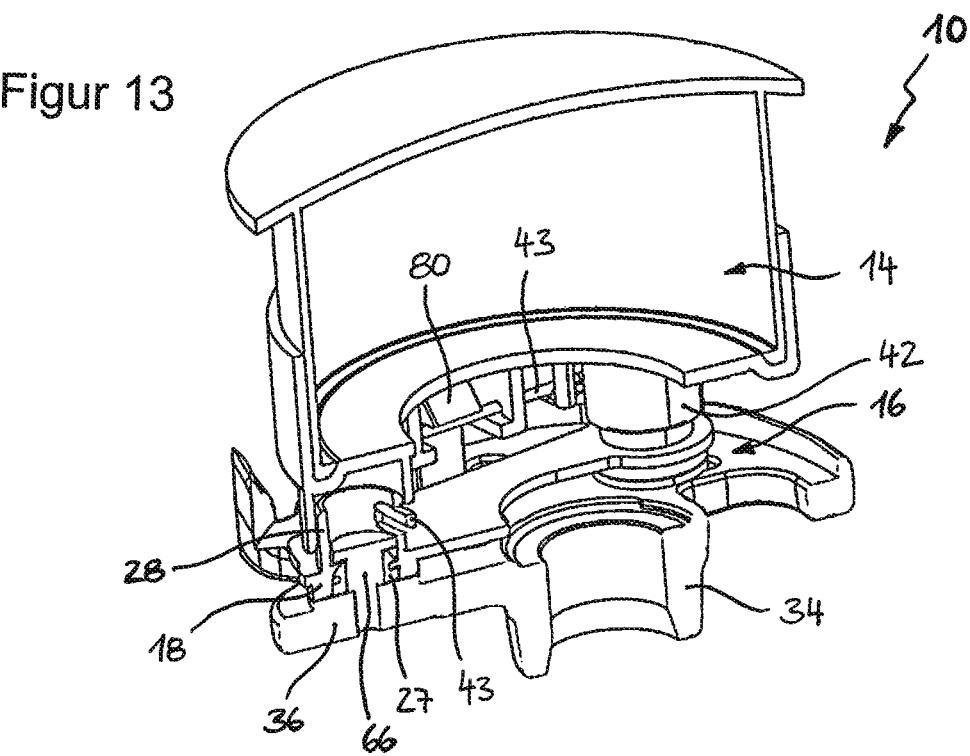
Figur 13

COUPLING DEVICE FOR THE ATTACHMENT OF AN AIRBAG MODULE TO A VEHICLE STEERING WHEEL IN AN OSCILLATORY MANNER

RELATED APPLICATIONS

This application corresponds to PCT/EP2017/070144, filed Aug. 9, 2017, which claims the benefit of German Application No. 10 2016 124 530.5, filed Dec. 15, 2016, the subject matter of which are incorporated herein by reference in their entirety.

BACKGROUND OF THE INVENTION

The invention relates to a coupling device for mounting an airbag module to be oscillating on a steering wheel structure of a vehicle steering wheel as well as to a subassembly and to a vehicle steering wheel comprising said coupling device.

In a plurality of vehicle steering wheels vibrations which the driver feels uncomfortable with are occurring during idling or in particular speed ranges of the vehicle. Said vibrations are due, inter alia, to the rigid coupling of the steering wheel to the steering column.

It is known to employ so-called vibration dampers to avoid undesired steering wheel vibrations so as to adjust the natural frequency of the overall system such that it is within an uncritical range. At present, for example the gas generator of an airbag module disposed within the steering wheel is used as a counter-oscillating damper mass.

Since vibration damping improves with an increasing damper mass, in DE 37 10 173 C2 already a vehicle steering is described in which the entire airbag module is advantageously used as a damper mass. By means of the shear stiffness of the vibration dampers used, the first natural frequency of the steering wheel/module system can be adjusted to be so low that it will be within a speed range of the vehicle in which high exciting amplitudes will not yet occur (for example at about 120 km/h).

In the case of oscillating airbag modules, the vibration dampers are currently also used to realize a horn function at the vehicle steering wheel, with a horn contact being provided at the airbag module and a respective mating contact being provided at the steering wheel structure. Such vehicle steering wheel is disclosed, for example, in U.S. Pat. No. 8,720,942 B2.

However, it has turned out that in steering wheels of this type especially on rough road tracks faulty activations of the vehicle horn will occur or, as compared to steering wheels having no vibration damping, longer contacting distances or higher contacting forces are required to activate the vehicle horn. This entails clearances of undesired large size at the vehicle steering wheel and impaired comfort when activating the vehicle horn.

SUMMARY OF THE INVENTION

It is the object of the invention to provide a vehicle steering wheel of simple constructional design including a vibration damper having an integrated horn function which has an as short actuating path as possible and an as low actuating force as possible while a high functional safety is given.

In accordance with the invention, this object is achieved by a coupling device for mounting a prefabricated airbag module so as to be oscillating on a steering wheel structure of a vehicle steering wheel, comprising a mounting member including, relative to a steering wheel axis, an axial bottom side which in the assembled state of the vehicle steering wheel faces the steering wheel structure and an opposite axial top side which in the assembled state of the vehicle steering wheel faces an airbag module, a contact face provided on the axial bottom side for a damping element for oscillating coupling of the mounting member to the steering wheel structure, as well as a locking element disposed on the top side of the mounting member for engaging in the airbag module, wherein the locking element is configured so that the airbag module can be coupled to the mounting member by a locking connection substantially in an axially fixed manner or in an axially restrictedly movable manner. Hence, with respect to the mounting member of the coupling device, on the side of the steering wheel structure a vibration damping takes place (especially transversely to the steering wheel axis), whereas on the module side a horn function can be realized (in the direction of the steering wheel axis). In this way, the horn function and the vibration damping function are separated from each other in a simple manner so that vibration excitations of the steering column and of the steering wheel structure tightly connected thereto (e.g. on rough road tracks) are initially damped between the steering wheel structure and the mounting member and no longer have an immediate effect on the module-side horn function. An oscillating coupling of the mounting member to the steering wheel structure by the damping element is to be understood within the scope of the present application in such way that the damping element enables damped vibration between the mounting member and the steering wheel structure at least transversely to the steering wheel axis, preferably also in the direction of the steering wheel axis. The maximum amplitude of possible vibration in the direction of the steering wheel axis is preferably smaller than an axial actuating path for activating a vehicle horn.

The mounting member of the coupling device preferably is a mounting plate that extends substantially perpendicularly to the steering wheel axis and especially includes plural locking elements, the locking elements being preferably formed integrally with the mounting plate. Further, the locking elements may be identically spaced from the steering wheel axis and may be arranged to be evenly spread in the circumferential direction. This results in simple and quick assembly of the coupling device as well as in stable support of the airbag module. Alternatively, it is also imaginable, as a matter of course, to provide plural separate mounting members each having a locking element for mounting the airbag module in an oscillating manner on the steering wheel structure.

A damping element may be associated with each locking element, with the locking elements and the associated damping elements being arranged axially in series.

According to one embodiment of the coupling device, on the axial top side of the mounting member a horn contact or an actuating member for activating a beep upon contact between the horn contact and a mating contact disposed at the airbag module is arranged, wherein the locking element is configured so that the airbag module can be coupled to the mounting member in an axially restrictedly movable manner by the locking connection. In other words, in this case the entire airbag module is axially displaced for actuating the vehicle horn, wherein both the horn contact and the mating contact are formed on components of the vehicle steering wheel that are supported so as to be oscillating.

According to another embodiment, the coupling device includes a damping element which is adjacent to the axial bottom side of the mounting member in the area of the contact surface and couples the mounting member to the steering wheel structure in an oscillating manner so that the mounting member and the steering wheel structure are movable relative to each other at least transversely to the steering wheel axis, especially wherein the damping element is preassembled at the axial bottom side of the mounting member. The damping element comprises a vibration-damping material as well as, optionally, stop elements and/or mounting sleeves abutting on the vibration-damping material.

In this embodiment, the damping element preferably extends through an opening of the mounting member.

Moreover, the damping element may comprise an annular vibration-damping material having a radial shoulder, with an edge of the mounting member opening forming a contact face and acting on the radial shoulder of the vibration-damping material.

In particular, the radial shoulder is in the form of a groove in the vibration-damping material, with the edge of the mounting member opening at least in portions engaging in the groove. This enables the damping element to be axially positioned and fixed on the mounting member in a quick and simple manner.

Incidentally, the object stated in the beginning is achieved by a subassembly comprising a steering wheel structure, an afore-described coupling device and a screw for mounting the coupling device to the steering wheel structure which extends through the annular vibration-damping material, the vibration-damping material being adjacent with an axial end face at least in portions to a screw head of the screw and/or being adjacent with an opposite axial end face at least in portions to the steering wheel structure. The limitation of the accommodating space for the vibration-damping material by components present anyway such as the mounting member, the screw head and/or the steering wheel structure is especially advantageous, because in such case separate mounting sleeves and/or stop elements can be dispensed with. Ideally the damping element then is formed exclusively by the vibration-damping material.

Further, the invention comprises a subassembly including a steering wheel structure, an afore-described coupling device and a damping element for oscillating coupling of the mounting member to the steering wheel structure, wherein the damping element is arranged on the axial bottom side of the mounting member and is preassembled together with the mounting member on the steering wheel structure.

The invention also comprises a subassembly having a prefabricated airbag module and an afore-described coupling device, wherein the airbag module, especially a module bottom of the airbag module, includes a mating contact axially abutting on the horn contact, and wherein the airbag module is supported so as to be axially movable relative to the mounting member for activating a beep.

The invention further relates to a subassembly comprising a prefabricated airbag module as well as an afore-described coupling device, wherein the airbag module includes a (manually operable) module cover including a horn contact as well as another module component including a mating contact axially abutting on the horn contact, the module cover being supported to be axially movable relative to the further module component for activating a beep. In other words, the horn function is realized in this case "inside" the airbag module, wherein also in this configuration variant the horn contact and the mating contact are formed on components of the vehicle steering wheel supported so as to be oscillating.

Finally, the object stated in the beginning is also achieved by a vehicle steering wheel of an automotive vehicle comprising a steering wheel structure, a prefabricated airbag module, an afore-described coupling device and a damping element for oscillating coupling of the mounting member to the steering wheel structure, wherein the vehicle steering wheel includes a horn contact and a mating contact axially abutting on the horn contact, and wherein both the horn contact and the mating contact are formed on components of the vehicle steering wheel that are supported to be oscillating. In particular, the coupling device and the damping element constitute a damper unit being preassembled on the steering wheel structure. In this way, the vehicle steering wheel can be assembled with especially little effort. The prefabricated damper unit is first connected, especially screwed, to the steering wheel structure, whereupon the equally prefabricated airbag module is axially fed until it locks with the damper unit and thus is secured to the steering wheel structure.

In an especially simply designed embodiment of the vehicle steering wheel, the airbag module is secured to the steering wheel structure exclusively by the locking connection to the coupling device.

As an alternative, it is also imaginable, however, that an additional (locking) connection is provided between the airbag module and the steering wheel structure which during normal driving of the vehicle admits a limited relative movement, to be sure, but upon activation of the airbag module ensures that the airbag module does not completely detach from the steering wheel structure. Consequently, the airbag module in this embodiment is secured to the steering wheel structure by means of the coupling device, wherein moreover another connection independent of the coupling device is provided between the airbag module and the steering wheel structure. This is of advantage as the connections to the coupling device in this case need not be designed for the extreme loads occurring, for example, upon activation of the airbag module.

BRIEF DESCRIPTION OF THE DRAWINGS

Further features and advantages of the invention will be evident from the following description of preferred embodiments with reference to the drawings, in which:

FIG. 1 shows a perspective exploded view of a vehicle steering wheel according to the invention comprising a coupling device according to the invention in accordance with one embodiment;

FIG. 2 shows a schematic detailed section across the steering wheel according to FIG. 1 in the area of a locking element of the coupling device;

FIG. 3 shows a perspective exploded view of a vehicle steering wheel according to the invention comprising a coupling device according to the invention in accordance with another embodiment;

FIG. 4 shows a schematic detailed section across the steering wheel according to FIG. 3 in the area of a locking element of the coupling device;

FIG. 5 shows a perspective view of a subassembly according to the invention for a vehicle steering wheel comprising a coupling device according to the invention in accordance with one embodiment;

FIG. 6 shows a perspective view of a subassembly according to the invention for a vehicle steering wheel comprising a coupling device according to the invention in accordance with another embodiment;

FIG. 7 shows a perspective view of a subassembly according to the invention for a vehicle steering wheel comprising a coupling device according to the invention in accordance with yet another embodiment;

FIG. 8 shows a perspective view of a subassembly according to the invention for a vehicle steering wheel comprising a coupling device according to the invention in accordance with yet another embodiment;

FIG. 9 shows a detailed section across the subassembly according to FIG. 8 in the area of a mounting member of the coupling device according to the invention;

FIG. 10 shows a perspective bottom view of the coupling device according to the invention in accordance with FIG. 9 in the area of the mounting member;

FIG. 11 shows a perspective bottom view of a damping element for the coupling device according to the invention in accordance with FIG. 10;

FIG. 12 shows a perspective view of a vehicle steering wheel comprising a coupling device according to the invention; and FIG. 13 shows a sectional view of a vehicle steering wheel according to the invention comprising a subassembly in accordance with FIG. 8 and an assembled airbag module.

DESCRIPTION

FIG. 1 illustrates a vehicle steering wheel 10 comprising a steering wheel structure 12, a prefabricated airbag module 14 and a coupling device 16 for mounting the airbag module 14 on the steering wheel structure 12 in an oscillating manner.

The coupling device 16 comprises a mounting member 18 including, relative to a steering wheel axis A, an axial bottom side 20 which in the assembled state of the vehicle steering wheel 10 faces the steering wheel structure 12 as well as an opposite axial top side 22 which in the assembled state of the vehicle steering wheel 10 faces the airbag module 14. On the axial bottom side 20 of the mounting member 18 a contact face 24 for a damping element 26 for oscillating coupling of the mounting member 18 to the steering wheel structure 12 is provided, whereas on the axial top side 22 at least one locking element 28 is arranged for locking with the airbag module 14.

The locking element 28 is configured so that the airbag module 14 can be coupled to the mounting member 18 by a locking connection substantially in an axially fixed manner or an axially restrictedly movable manner.

According to FIG. 1 the mounting member 18 is a mounting plate extending perpendicularly to the steering wheel axis A and including three locking elements 28. The mounting member 18 in this case is a metal part formed integrally with the locking elements 28, wherein the locking elements 28 are identically spaced apart from the steering wheel axis A and are arranged to be evenly spread in the circumferential direction. Alternatively, also configuration variants in which the mounting member 18 is made from robust plastic material are imaginable, however.

The coupling device 16 in the shown embodiment includes three damping elements 26 each of which is adjacent to a contact face 24 on the axial bottom side 20 of the mounting plate.

According to FIG. 1, a damping element 26 is associated with each locking element 28, wherein the locking elements 28 and the associated damping elements 26 are arranged axially in series.

FIG. 2 illustrates a detailed section across the vehicle steering wheel 10 according to FIG. 1 in the area of a damping element 26 and the associated locking element 28 thereof.

The damping element 26 in this case comprises a vibration-damping material 27, for example an elastomer, as well as two stop elements 30 and a mounting sleeve 32, each abutting on the vibration-damping material 27. The stop elements 30 are arranged axially on both sides of the vibration-damping material 27, while the mounting sleeve 32 extends axially between the stop elements 30.

The steering wheel structure 12 generally comprises a steering wheel armature having a steering wheel rim, at least one spoke as well as a hub 34 and a hub plate 36. Moreover, the steering wheel structure 12 usually further comprises a foam coating 38, for example made from polyurethane, which at least partially surrounds the steering wheel armature.

According to FIG. 2, the damping element 26 is secured to the steering wheel armature via the mounting sleeve 32, with the mounting sleeve 32 and the hub plate 36 forming a bayonet joint, for example.

It is further evident that the mounting member 18 including the integrally formed locking element 28 is connected to the damping element 26 by a screw 40 and to the steering wheel armature via the damping element 26 in this case.

The vibration-damping material 27 may be connected already in advance, e.g. by vulcanizing, to the mounting sleeve 32 and the stop elements 30 so as to constitute the prefabricated damping element 26 with the latter. Then the mounting sleeve 32 of each individual damping element 26 is secured to the steering wheel structure 12, concretely to the hub plate 36 of the steering wheel structure 12, in the way of a bayonet lock. Finally, the mounting member 18 including its integrally formed locking elements 28 is inserted and connected to the individual damping elements 26 by the screws 40.

As will be exemplified later by way of FIG. 4, as a matter of course also alternatives for securing the coupling device 16 to the steering wheel structure 12 are imaginable, however.

At any rate, in this way a subassembly comprising the steering wheel structure 12, the afore-described coupling device 16 and at least one damping element 26 for oscillating coupling of the mounting member 18 to the steering wheel structure 12 is resulting, with the at least one damping element 26 being arranged on the axial bottom side 20 of the mounting member 18 and being preassembled together with the mounting member 18 on the steering wheel structure 12.

According to FIGS. 1 and 2, the locking elements 28 of the coupling device 16 are rigid detent hooks which upon axially attaching the prefabricated airbag module 14 immerse in module bushes 42 and lock with a spring wire 43 mounted on the airbag module 14.

FIG. 3 illustrates a vehicle steering wheel 10 which differs from the steering wheel design of FIG. 1 merely by a different configuration of the coupling device 16. In order to avoid repetitions, therefore the foregoing description is generally referred to and, in the following, mainly differences shall be discussed.

As compared to the embodiment according to FIG. 1, the coupling device 16 according to FIG. 3 includes a different mounting on the steering wheel structure 12 which is especially advantageous as regards the assembling effort. Instead of the stop elements 30 and the mounting sleeves 32, the coupling device 16 includes a base plate 44 for assembling the mounting member 18 on the steering wheel structure 12.

The vibration-damping material 27 in this case forms the damping element 26 and can be connected, for example by vulcanizing, already in advance to the mounting member 18 and the base plate 44 so that the damping element 26 is part of the prefabricated coupling device 16.

By way of the detailed section according to FIG. 4, it becomes evident that the base plate 44 of the coupling device 16 then only has to be secured to the steering wheel structure 12, wherein the base plate 44 in the present embodiment is concretely screwed to the hub plate 36 of the steering wheel structure 12 by a screw 46.

For further reducing the assembling effort for the coupling device 16, alternatively or additionally to screwing it is also imaginable to foam the base plate 44 at least on the edge side into the foam coating 38 and thus to secure it to the steering wheel structure 12.

In order to prevent the airbag module 14 when being activated from completely detaching from the steering wheel structure 12, directly on the steering wheel structure 12 catch elements may be provided which during normal driving are spaced apart from the airbag module 14 and only when the module is activated act immediately on the airbag module 14 and withhold the module 14. Said catch elements are, for example, catch hooks or stop hooks 80 integrally formed on the steering wheel armature of the steering wheel structure 12 (cf. FIG. 12).

According to a specific variant of the vehicle steering wheel 10 such catch elements are not provided. The airbag module 14 in that case is secured to the steering wheel structure 12 exclusively via the coupling device 16. In order to fix the locking element 28 of the coupling device 16 especially tightly and reliably on the steering wheel structure 12 in this case, a screw 48 indicated in broken lines in FIG. 4 is provided alternatively or additionally to the screw 46.

As regards a horn function of the steering wheel 10, it is especially advantageous when the vehicle steering wheel 10 includes a horn contact 50 as well as a mating contact 52 axially abutting on the horn contact 50, wherein both the horn contact 50 and the mating contact 52 are formed at components of the vehicle steering wheel 10 that are supported to be oscillating.

Components supported to be oscillating in this context are, for example, the mounting member 18 of the coupling device 16 as well as the airbag module 14 including all of its module components.

In FIGS. 5 to 7 various options for realizing such horn function on the vehicle steering wheel 10 are exemplified.

FIG. 5 illustrates a subassembly for the vehicle steering wheel 10 comprising a prefabricated airbag module 14 and a coupling device 16 which has a horn contact 50 for activating a beep on the top side 22 of the mounting member 18.

The airbag module 14 includes a mating contact 52 axially abutting on the horn contact 50, wherein the (entire) airbag module 14 is supported to be axially movable relative to the mounting member 18 for activating the beep. In other words, the prefabricated airbag module 14 hence is coupled to the mounting member 18 to be axially restrictedly movable in the assembled state of the vehicle steering wheel 10 via the locking connection to the locking elements 28 of the coupling device 16.

FIG. 6 illustrates another subassembly for the vehicle steering wheel 10 which differs from the embodiment according to FIG. 5 merely by the fact that the airbag module 14 includes both the horn contact 50 and the mating contact 52 axially spaced apart from the horn contact 50. The mounting member 18 supported to be oscillating includes at least one axially projecting actuating element 53 being axially abutting on the horn contact 50, wherein two hook-shaped projections are provided as actuating elements 53 in the shown variant. For activating the horn, the (entire) airbag module 14 then is moved axially in the direction of the mounting member 18 against a spring force, with the horn contact 50 being deformed or displaced in the direction of the mating contact 52 by the at least one actuating element 53 until the desired beep sounds when the contacts will touch each other.

Finally, FIG. 7 shows another embodiment of the subassembly for the vehicle steering wheel 10 comprising a prefabricated airbag module 14 and a coupling device 16, with the horn function being integrated in the airbag module 14. The prefabricated airbag module 14 in this case includes a module cover 54 having the horn contact 50 and another module component 56 having the mating contact 52 axially abutting on the horn contact 50, wherein the module cover 54 is supported to be axially movable relative to the further module component 56 for activating the beep.

As compared to the configuration variants according to FIGS. 5 and 6, hence a horn activation according to FIG. 7 is not effectuated by displacing the entire airbag module 14 but by a relative movement between the module cover 54 and the further module component 56, for example a module casing.

However, all configuration variants share the fact that all components required for horn activation such as horn contacts 50, mating contacts 52 and/or actuating elements 53 are supported to be oscillating on the steering wheel structure 12. In other words, in a vehicle steering wheel 10 including a vibration damper all of the components required for activating the horn are part of the damper mass of the steering wheel vibration damper.

This is also applicable to the further embodiment of the coupling device 16 shown in FIGS. 8 to 13 in which the damping element 26 extends through an opening 58 of the mounting member 18.

In the present embodiment, the damping element 26 is made from the vibration-damping material 27 that is annular and has a radial shoulder on the outside. The mounting member opening 58 has an opening edge including radially inwardly protruding projections 60, 62 which form the contact face 24 for the damping element 26 and act on the radial shoulder of the vibration-damping material 27.

The radial shoulder in the vibration-damping material 27 is a peripheral groove 64 according to FIG. 11, with the opening edge, concretely the projections 60 of the opening edge engaging in the groove 64. In this way, the elastic ring made from vibration-damping material 27 can be quickly and easily attached to the opening 58 so that the damping element 26 is axially positioned and fixed on the mounting member 18 with minimum effort. Each projection 60 of the mounting member 18 includes an axial bottom side 20 facing the steering wheel structure 12 and forms a contact face 24 for the damping element 26 which in the present case corresponds to the annular vibration-damping material 27.

FIGS. 8 and 9 illustrate a subassembly comprising a steering wheel structure 12, a coupling device 16 and a screw 66 for assembling the coupling device 16 on the steering wheel structure 12, with the screw 66 extending through the annular vibration-damping material 27.

With respect to a screw axis S the screw 66 extends from a screw head 68 in the axial direction via a screw shank 70 to a free shank end 72. The screw shank 70 is stepped having a spacer portion 74 abutting on the screw head 68 and a thread portion 76 abutting on the spacer portion 74 toward the free shank end 72, which thread portion is separated from the spacer portion 74 by a step 78. The thread portion 76 has a smaller shank diameter than the spacer portion 74 and is screwed into the hub plate 36 of the steering wheel structure 12 until the step 78 contacts the hub plate 36 and prevents further screwing.

The locking element 28 extends in the axial direction from the mounting member 18 to a free end and is substantially hollow-cylindrical, with a locking projection being integrally formed at the free end. An outer diameter of the screw head 68 is somewhat smaller than an inner diameter of the locking element 28 so that the screw 66 can be inserted into the locking element 28 and extends through the opening 58 of the mounting member 18 into the hub plate 36. Said screwing of the mounting member 18 in the area of the locking element 28 contributes to an especially compact design of the coupling device 16.

According to FIG. 9, an axial dimension of the spacer portion 74 of the screw 66 is somewhat larger than an axial dimension of the mounting member 18 in the area of the damping element 26 so that a predetermined movement of the mounting member 18 relative to the steering wheel structure 12 is possible for vibration damping.

An axial dimension of the damping element 26 is at least as large as the axial dimension of the distance portion 74 so that the vibration-damping material 27 is axially positioned as well as preferably slightly compressed when the screw 66 is tightened.

The groove 64 in the vibration-damping material 27 is disposed so that in a non-excited idle position of the vehicle steering wheel 10, the mounting member 18 is held to be axially spaced apart from the screw head 68 and the hub plate 36, especially substantially axially centrally between the screw head 68 and the hub plate 36, via its projections 60 engaging in the groove 64.

Just as the projections 60, also the projections 62 of the mounting member 18 axially abutting on the screw head 68 have axial bottom sides 20 facing the steering wheel structure 12 each of which forms a contact face 24 for the damping element 26. Primarily the projections 60 serve as stops of the mounting member 18 on the screw head 68, however, so as to define a maximum relative movement between the mounting member 18 and the steering wheel structure 12.

The vibration-damping material 27 is adjacent with an axial end face at least in portions to the screw head 68 of the screw 66 and is adjacent with an opposite axial end face at least in portions to the steering wheel structure 12.

Thus, an accommodating space for the vibration-damping material 27 is defined in the axial direction by the screw head 68 and the steering wheel structure 12 as well as in the radial direction by the spacer portion 74 of the screw shank 70 and the mounting member 18. Therefore, separate stop elements 30 and mounting sleeves 32 (as shown in FIG. 2, for example) can advantageously be dispensed with.

If exceptionally high forces, as they occur e.g. upon activation of the airbag module 14, cannot be transmitted by the connection between the airbag module 14 and the coupling device 16 and/or by the connection between the coupling device 16 and the steering wheel structure 12, it is imaginable that the airbag module 14 is not only secured to the steering wheel structure 12 by means of the coupling device 16 but that moreover a further connection between the airbag module 14 and the steering wheel structure 12 independent of the coupling device 16 is provided.

This is illustrated, for example, in a vehicle steering wheel 10 according to FIG. 12. In the shown steering wheel design, a coupling device 16 and a steering wheel structure 12 are provided, wherein a mounting member 18 of the coupling device 16 in the form of a mounting plate is connected to the steering wheel structure 12 in an oscillating manner and includes locking elements 28 for locking with the airbag module 14. Furthermore, at the steering wheel structure 12 there are provided catch elements which during normal driving are spaced apart from the airbag module 14 and only upon activation of the module act immediately on the airbag module 14 and withhold the same. According to FIG. 12, said catch elements are detent hooks 80 integrally formed on the steering wheel armature of the steering wheel structure 12.

FIG. 13 illustrates the vehicle steering wheel 10 according to FIG. 12 with a coupling device 16 according to FIG. 9 and an assembled airbag module 14. Herefrom it is evident that the spring wire 43 tightly connected to the airbag module 14 engages both in the locking elements 28 of the coupling device 16 and in the detent hooks 80 of the steering wheel structure 12.

The invention claimed is:

1. A coupling device for mounting an airbag module (14) to be oscillating on a steering wheel structure (12) of a vehicle steering wheel (10), comprising:
   a mounting member (18) having an axial bottom side (20) relative to a steering wheel axis (A) which in the assembled state of the vehicle steering wheel (10) faces the steering wheel structure (12) as well as an opposite axial top side (22) which in the assembled state of the vehicle steering wheel (10) faces the airbag module (14),
   a contact face (24) provided on the axial bottom side (20) for a damping element (26) for oscillating coupling of the mounting member (18) to the steering wheel structure (12), as well as
   a locking element (28) disposed on the top side (22) of the mounting member (18) for locking with the airbag module (14),
   wherein the locking element (28) is configured so that the airbag module (14) can be coupled to the mounting member (18) by a locking connection substantially in an axially fixed manner or in an axially restrictedly movable manner.

2. The coupling device according to claim 1, wherein the mounting member (18) is a mounting plate which extends substantially perpendicularly to the steering wheel axis (A) and includes plural locking elements (28).

3. The coupling device according to claim 1, wherein plural locking elements (28) are provided and a damping element (26) is associated with each locking element (28), wherein the locking elements (28) and the associated damping elements (26) are arranged axially in series.

4. The coupling device according to claim 1, wherein the axial top side (22) of the mounting member a horn contact (50) or an actuating element (53) for activating a beep is arranged and the locking element (28) is configured so that the airbag module (14) can be coupled to the mounting member (18) by the locking connection in an axially restrictedly movable manner.

5. The coupling device according to claim 1, wherein the coupling device (16) includes a damping element (26) which contacts the contact face (24) on the axial bottom side (20) of the mounting member (18) and couples the mounting member (18) to the steering wheel structure (12) in an oscillating manner so that the mounting member (18) and the steering wheel structure (12) are movable relative to each other at least transversely to the steering wheel axis (A), wherein the damping element (26) is preassembled on the axial bottom side (20) of the mounting member (28).

6. The coupling device according to claim 5, wherein the damping element (26) extends through an opening (58) of the mounting member (18).

7. The coupling device according to claim 6, wherein the damping element (26) comprises an annular vibration-damping material (27) having a radial shoulder, wherein an edge of the opening (58) forms a contact face (24) and acts on the radial shoulder of the vibration-damping material (27).

8. The coupling device according to claim 7, wherein the radial shoulder is configured as a groove (64) in the vibration-damping material (27), wherein the edge of the mounting member opening (58) at least in portions engages in the groove (64).

9. A subassembly comprising:
a steering wheel structure (12), a coupling device (16) according to claim 7, and
a screw (66) for mounting the coupling device (16) on the steering wheel structure (12) which screw extends through the annular vibration-damping material (27), wherein the vibration-damping material (27) with an axial end face is adjacent at least in portions to a screw head (68) of the screw (66) and/or with an opposite axial end face is adjacent at least in portions to the steering wheel structure (12).

10. A subassembly comprising:
a steering wheel structure (12),
a coupling device (16) according to claim 1, and
a damping element (26) for oscillating coupling of the mounting member (18) to the steering wheel structure (12),
wherein the damping element (26) is arranged on the axial bottom side (20) of the mounting member (18) and is preassembled together with the mounting member (18) on the steering wheel structure (12).

11. A subassembly comprising:
a prefabricated airbag module (14) and
a coupling device (16) according to claim 1,
wherein the prefabricated airbag module (14) includes a module cover (54) including a horn contact (50) as well as another module component (56) including a mating contact (52) axially abutting on the horn contact (50), with the module cover (54) being supported to be axially movable relative to the further module component (56) for activating a beep.

12. A subassembly comprising
a prefabricated airbag module (14) and
a coupling device (16) according to claim 4,
wherein the prefabricated airbag module (14) includes a mating contact (52) axially abutting on the horn contact (50), with the airbag module (14) being supported to be axially movable relative to the mounting member (18) for activating a beep.

13. A vehicle steering wheel of an automotive vehicle, comprising
a steering wheel structure (12),
a prefabricated airbag module (14),
a coupling device (16) according to claim 1 and a damping element (26) for oscillating coupling of the mounting member (18) to the steering wheel structure (12),
wherein the vehicle steering wheel (10) includes a horn contact (50) as well as a mating contact (52) axially abutting on the horn contact (50), and wherein both the horn contact (50) and the mating contact (52) are formed on components of the vehicle steering wheel (10) that are supported so as to be oscillating.

14. The vehicle steering wheel according to claim 13, wherein the airbag module (14) is secured to the steering wheel structure (12) exclusively by the locking connection to the coupling device (16).

15. The vehicle steering wheel according to claim 13, wherein the airbag module (14) is secured to the steering wheel structure (12) by means of the coupling device (16), wherein moreover another connection independent of the coupling device (16) is provided between the airbag module (14) and the steering wheel structure (12).

* * * * *